United States Patent
Klemen et al.

(10) Patent No.: US 7,282,003 B2
(45) Date of Patent: Oct. 16, 2007

(54) POWERTRAIN INCLUDING INPUT DISCONNECT AND ACCESSORY DRIVE SYSTEM FOR AN ELECTRICALLY VARIABLE TRANSMISSION

(75) Inventors: Donald Klemen, Carmel, IN (US); Michael R. Schmidt, Carmel, IN (US)

(73) Assignee: General Motors Corporation, Detroit, MI (US)

( * ) Notice: Subject to any disclaimer, the term of this patent is extended or adjusted under 35 U.S.C. 154(b) by 109 days.

(21) Appl. No.: 10/901,722

(22) Filed: Jul. 29, 2004

(65) Prior Publication Data

US 2006/0025260 A1 Feb. 2, 2006

(51) Int. Cl.
F16H 3/72 (2006.01)

(52) U.S. Cl. ........................ 475/5; 180/65.4; 180/65.7; 74/15.2

(58) Field of Classification Search ............... 475/5, 475/6; 477/2, 3, 4, 5; 701/22; 180/65.2, 180/65.4, 65.7, 65.3; 290/40 A, 40 C; 74/11, 74/15.2, 15.4, 15.6
See application file for complete search history.

(56) References Cited

U.S. PATENT DOCUMENTS

| | | | |
|---|---|---|---|
| 5,009,301 A | 4/1991 | Spitler | 192/106.2 |
| 5,558,589 A | 9/1996 | Schmidt | 475/5 |
| 5,669,842 A * | 9/1997 | Schmidt | 475/5 |
| 5,931,757 A | 8/1999 | Schmidt | 475/2 |
| 5,935,035 A * | 8/1999 | Schmidt | 475/5 |
| 6,251,042 B1 * | 6/2001 | Peterson et al. | 477/3 |
| 6,318,485 B1 * | 11/2001 | Osuga et al. | 180/53.8 |
| 6,358,173 B1 * | 3/2002 | Klemen et al. | 475/5 |
| 6,491,599 B1 * | 12/2002 | Schmidt | 475/5 |
| 6,524,218 B1 * | 2/2003 | Yamada et al. | 477/5 |
| 6,953,409 B2 * | 10/2005 | Schmidt et al. | 475/5 |
| 6,986,398 B2 * | 1/2006 | Obayashi | 180/65.2 |
| 2002/0179047 A1 * | 12/2002 | Hoang et al. | 123/350 |
| 2004/0172946 A1 * | 9/2004 | Gray, Jr. | 60/698 |

\* cited by examiner

Primary Examiner—David D. Le

(57) ABSTRACT

A vehicle powertrain includes an engine connected to an input torque device including a torque isolator. A plurality of intermeshed accessory drive gears are connected to the torque device for driving accessories. A hybrid electromechanical transmission is connected to one of the accessory drive gears. A motor/generator of the hybrid electromechanical transmission is operable to drive the accessory drive gears when the engine is not running.

17 Claims, 2 Drawing Sheets

POWERTRAIN INCLUDING INPUT DISCONNECT AND ACCESSORY DRIVE SYSTEM FOR AN ELECTRICALLY VARIABLE TRANSMISSION

TECHNICAL FIELD

The present invention relates to an input disconnect and accessory drive system for an electrically variable transmission in a powertrain wherein accessory drive gears are connected between an electrically variable transmission and an engine such that accessories may be driven by an electric motor in the transmission when the engine is not running.

BACKGROUND OF THE INVENTION

The purpose of a vehicular transmission is to provide a neutral, at least one reverse and one or more forward driving ranges that impart power from an engine, and/or other power sources, to the drive members which deliver the tractive effort from the vehicle to the terrain over which the vehicle is being driven. As such, the drive members may be front wheels, rear wheels or a track, as required to provide the desired performance.

A series propulsion system is a system in which energy follows a path from an engine to an electric storage device and then to an electrical motor which applies power to rotate the drive members. There is no direct mechanical connection between the engine and the drive members in a series propulsion system.

Transmissions adapted to receive the output power from either an engine or an electric motor, or both, have heretofore relied largely on what has been designated as series, hybrid propulsion systems. Such systems are designed with auxiliary power units (APUs) of relatively low power for minimum emissions and best fuel economy. However, such combinations of small APUs and even large energy storage devices do not accommodate high-average power vehicles or address duty cycles that demand continuous, constant speed operation. Steep grades and sustained high-average cruising speeds at desired high efficiencies are not achievable with a typical, series, hybrid transmission configuration.

The challenge, therefore, is to provide a power system that will operate at high efficiencies over a wide variety of operating conditions. Desirable electric variable transmissions should leverage the benefits of a series, hybrid transmission for desirable low-average power duty cycles—i.e., low speed start/stop duty cycles—as well as the benefits of a parallel hybrid transmission for high-average output power, high speed duty cycles. In a parallel arrangement the power supplied by the engine and the power supplied by the source of electrical energy are independently connected to the drive members.

Moreover, perfecting a concept wherein two modes, or two integrated power split gear trains, with either mode available for synchronous selection by the on-board computer to transmit power from the engine and/or the motor/generator to the output shaft results in a hybrid transmission having an extremely wide range of applications.

The desired beneficial results may be accomplished by the use of a variable, two-mode, input and compound split, parallel hybrid electro-mechanical transmission. Such a transmission utilizes an input member to receive power from the vehicle engine and a power output member to deliver power to drive the vehicle. First and second motor/generator power controllers are connected to an energy storage device, such as a batter pack, so that the energy storage devices can accept power from, and supply power to, the first and second motor/generators. A control unit regulates power flow among the energy storage devices and the motor/generators as well as between the first and second motor/generators.

A variable, two-mode, input-split, parallel, hybrid electro-mechanical transmission also employs at least one planetary gear set. The planetary gear set has an inter gear member and an outer gear member, each of which meshingly engages a plurality of planet gear members. The input member is operatively connected to one of the gear members in the planetary gear set, and means are provided operatively to connect the power output member to another of the gear members in the planetary gear set. One of the motor/generators is connected to the remaining gear member in the planetary gear set, and means are provided operatively to connect the other motor/generator to the output shaft.

Operation in the first or second mode may be selectively achieved by using torque transfer devices. Heretofore, in one mode the output speed of the transmission is generally proportional to the speed of one motor/generator, and in the second mode the output speed of the transmission is generally proportional to the speed of the other motor/generator.

In some embodiments of the variable, two-mode, input-split, parallel, hybrid electro-mechanical transmission, a second planetary gear set is employed. In addition, some embodiments may utilize three torque transfer devices—two to select the operational mode desired of the transmission and the third selectively to disconnect the transmission from the engine. In other embodiments, all three torque transfers may be utilized to select the desired operational mode of the transmission.

With reference, again, to a simple planetary gear set, the planet gear members are normally supported for rotation on a carrier that is itself rotatable. When the sun gear is held stationary and power is applied to the ring gear, the planet gear members rotate in response to the power applied to the ring gear and thus "walk" circumferentially about the fixed sun gear to effect rotation of the carrier in the same direction as the direction in which the ring gear is being rotated.

When any two members of a simple planetary gear set rotate in the same direction and at the same speed, the third member is forced to turn at the same speed, and in the same direction. For example, when the sun gear and the ring gear rotate in the same direction, and at the same speed, the planet gears do not rotate about their own axes but rather act as wedges to lock the entire unit together to effect what is known as direct drive. That is, the carrier rotates with the sun and ring gears.

However, when the two gear members rotate in the same direction, but at different speeds, the direction in which the third gear member rotates may often be determined simply by visual analysis, but in many situations the direction will not be obvious and can only be determined by knowing the number of teeth present in the gear members of the planetary gear set.

Whenever the carrier is restrained from spinning freely, and power is applied to either the sun gear or the ring gear, the planet gear members act as idlers. In that way, the driven member is rotated in the opposite direction as the drive member. Thus, in many transmission arrangements when the reverse drive range is selected, a torque transfer device serving as a brake is actuated frictionally to engage the carrier and thereby restrain it against rotation so that power applied to the sun gear will turn the ring gear in the opposite direction. Thus, if the ring gear is operatively connected to the drive wheels of a vehicle, such an arrangement is capable of reversing the rotational direction of the drive wheels, and thereby reversing the direction of the vehicle itself.

As those skilled in the art will appreciate, a transmission system using a power split arrangement will receive power from two sources. Utilization of one or more planetary gear sets permits two or more gear trains, or modes, by which to deliver power from the input member of the transmission to the output member thereof.

U.S. Pat. No. 5,558,589, which issued on Sep. 24, 1996 to General Motors Corporation and is hereby incorporated by reference, teaches a variable, two-mode, input-split, parallel, hybrid electromechanical transmission wherein a "mechanical point" exists in the first mode and two mechanical points exist in the second mode. U.S. Pat. No. 5,931,757, which issued on Aug. 3, 1999 to General Motors Corporation and is hereby incorporated by reference, teaches a two-mode, compound-split, electromechanical transmission with one mechanical point in the first mode and two mechanical points in the second mode.

A mechanical point occurs when either of the motor/generators is stationary at any time during operation of the transmission in either the first or second mode. The lack of a mechanical point is a drawback inasmuch as the maximum mechanical efficiency in the transfer of power from the engine to the output occurs when one of the motor/generators is at a mechanical point, i.e., stationary. In variable, two-mode, input-split, parallel, hybrid electro-mechanical transmissions, however, there is typically one point in the second mode at which one of the motor/generators is not rotating such that all the engine power is transferred mechanically to the output.

Electrically variable transmissions provide the ability to turn the engine off and drive the vehicle via one of the motor/generators in order to reduce idle fuel usage, reduce emissions, provide noise reduction, allow passenger drop-off inside a building, etc. Under these circumstances, the vehicle must maintain the ability to drive accessories, such as the water pump, air pump, power steering pump, and air conditioner. This is accomplished by adding accessory high voltage drive motors to perform these functions. In addition to the accessory motor, a controller and high voltage wiring are also required, which add further cost and weight.

SUMMARY OF THE INVENTION

The invention provides a vehicle powertrain with an electrically variable transmission connected to an engine via accessory drive gears. Accordingly, a motor/generator of the electrically variable transmission may be used to drive the accessories via the accessory drive gears when the engine is not running. An input torque transfer device and torque isolator may also be provided on the engine to disconnect the engine from the transmission and to provide damping of driveline excitation so that the accessories and transmission do not receive excitation from engine vibrations.

More specifically, the invention provides a vehicle powertrain including an engine, an input torque transfer device operatively connected to an output of the engine, wherein the input torque transfer device includes a torque isolator, and a plurality of intermeshed accessory drive gears operatively connected to the torque transfer device. The accessory drive gears are respectively connectable with a plurality of accessories for driving the accessories. A hybrid electromechanical transmission includes an input shaft operatively connected to one of the drive gears. The transmission includes first and second motor/generators, a plurality of gear arrangements, and a plurality of torque-transmitting mechanisms for selecting operating modes and speeds of the transmission. One of the motor/generators is selectively operable to drive the accessory drive gears when the engine is not running.

The engine and transmission may be arranged in parallel, or coaxially end-to-end.

The torque isolator is operatively connected between the engine and the accessory drive gears so that when accessories connected to the accessory drive gears are driven by the engine, the accessories are isolated from engine excitation by the torque isolator. The accessories are selected from the group consisting of power steering components, air conditioning components, air compressors, water pumps, etc.

The accessory drive gears extend transversely with respect to the engine and transmission. The accessory drive gears are operatively connected to a power take off arrangement including a plurality of quick change gears which are interchangeable to alter an output speed ratio to a driven accessory.

The powertrain is characterized by the absence of a torque converter, and the input torque transfer device is operative as a starting clutch to selectively connect and disconnect the engine and the transmission.

The hybrid electromechanical transmission may include any of a variety of different configurations.

The above features and advantages and other features and advantages of the present invention are readily apparent from the following detailed description of the best modes for carrying out the invention when taken in connection with the accompanying drawings.

DESCRIPTION OF THE PREFERRED EMBODIMENTS

Figure 1:
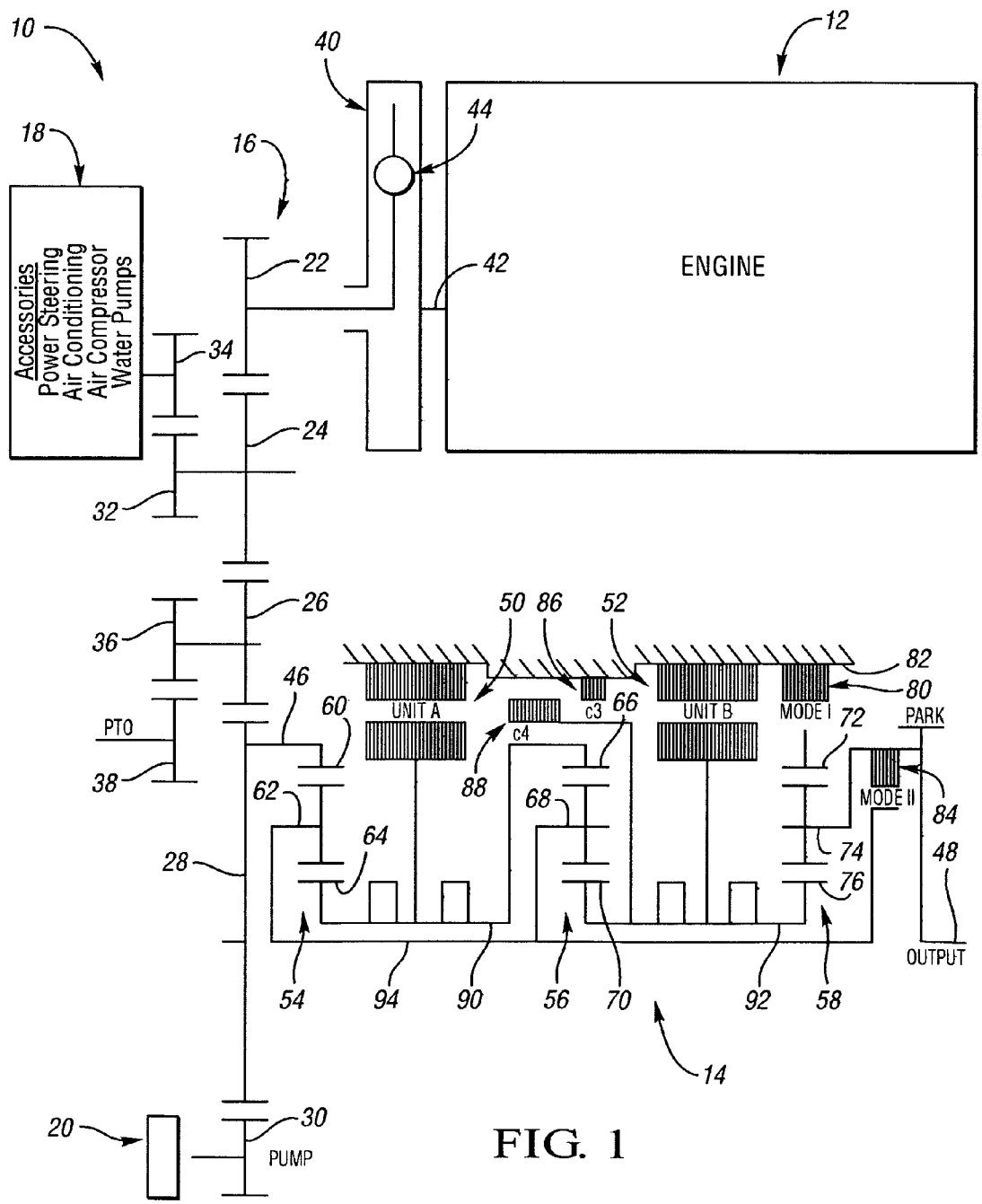
FIG. 1 shows a schematic illustration of a powertrain including an engine and a hybrid electromechanical transmission arranged in parallel, and connected by a plurality of accessory drive gears in accordance with the invention.

Referring to FIG. 1, a powertrain 10 is shown in accordance with a first embodiment of the invention. In this embodiment, an engine 12 and hybrid electrical transmission 14 are arranged in parallel to improve packaging length. In a rear bus application, this parallel arrangement provides additional space for passenger seating.

The hybrid electromechanical transmission 14 enables the vehicle to be driven in electric mode when the engine is not running. This mode may be selected to reduce idle fuel usage, reduce emissions, allow passenger drop off inside a building, provide noise reduction, etc. In such applications, driving accessories such as the air pump, water pump, power steering system, air conditioner, etc. may still be required, even with the engine off. Accordingly, the powertrain 10 provides a plurality of intermeshed accessory drive gears 16 which may be driven by the engine 12 or by the motor/generators of the transmission 14 to drive accessories 18, which may include power steering, air conditioning, air compressors, water pumps, etc. The accessory drive gears 16 may also drive a transmission pump 20, for example.

The accessory drive gears 16 include the intermeshed gears 22, 24, 26, 28, 30, preferably of even number of gears to retain correct output rotation. The gear 24 is engaged with the quick change power take off gears 32, 34 for driving one or more of the accessories 18. The quick change gears 32, 34 may be selectively interchangeable with the gears 36, 38 (or with other gears) to alter an output speed ratio to one or more selected accessories 18. The quick change power take off gears 32, 34, 36, 38 may be positioned under a removable cover to facilitate such interchange of gears. The gears 32, 34, 36, 38 would preferably have different numbers of teeth to facilitate the different ratios.

As further shown in FIG. 1, an input torque transfer device 40, such as an input clutch, is connected to an output 42 of the engine 12. The input torque transfer device 40 is not utilized to change or control the mode in which the hybrid transmission operates. Rather, the input torque transfer device 40 permits selective engagement and disengagement of the engine 12 with respect to the hybrid transmission 14.

The input torque transfer device 40 includes a torque isolator 44 to damp excitation induced on the powertrain 10 by the engine 12. An example of a torque isolator is disclosed in detail in U.S. Pat. No. 5,009,301, which issued on Apr. 23, 1991 to General Motors Corporation and is hereby incorporated by reference in its entirety.

By positioning the torque isolator 44 adjacent the engine 12, the accessories 18 are effectively damped from powertrain excitation. Damping of accessories is not possible with engine drive accessories on prior art automatic transmissions utilizing a torque converter device.

The hybrid transmission 14 shown in FIG. 1 is illustrated by way of example, however any hybrid transmission may be implemented in its place for use with the present invention. By way of example, the hybrid transmission 14 illustrated is a two-mode compound split hybrid electromechanical transmission having an input shaft 46 operatively connected to the gear 28, and an output shaft 48 operatively associated with drive wheels of the vehicle. Between the input shaft 46 and output shaft 48, the transmission 14 includes first and second motor/generators 50, 52, and first, second and third planetary gear arrangements 54, 56, 58. The first planetary gear arrangement 54 includes a ring gear 60, planet carrier assembly member 62, and sun gear 64. The second planetary gear arrangement 56 includes the ring gear 66, planet carrier assembly member 68, and sun gear 70. The third planetary gear arrangement 58 includes the ring gear 72, planet carrier assembly member 74, and sun gear 76. A first clutch 80 selectively connects the ring gear 72 with the transmission housing 82 to provide a first mode of operation of the transmission 14. The second clutch 84 selectively connects the planet carrier assembly members 62, 68 with the planet carrier assembly member 74 and with the output shaft 48 to provide a second mode of operation of the transmission 14. A third clutch 86 selectively connects the sun gear 70 with the transmission housing 82. A fourth clutch 88 selectively connects the sun gear 64 with the sun gear 70. A first interconnecting member 90 connects the sun gear 64 with the ring gear 66. A second interconnecting member 92 connects the sun gears 70, 76. A third interconnecting member 94 connects the planet carrier assembly members 62, 68.

A complete operating description of the transmission 14 will not be provided herein, as its operation is not essential to the invention, and a variety of hybrid transmissions could replace it. By way of example, a similarly functioning hybrid transmission is described in U.S. Provisional Application 60/531,528, filed Dec. 19, 2003 and assigned to General Motors Corporation, and hereby incorporated by reference in its entirety.

Accordingly, when the powertrain 20 is in electric mode only with the engine 12 not running, the motor/generator 50 may be used to drive the accessories 18 through the accessory drive gears 16. Also, when the engine 12 is running, the accessories 18 are driven via the input torque transfer device 40 and torque isolator 44 through the accessory drive gears 16, such that engine excitation is damped by the torque isolator 44.

Figure 2:
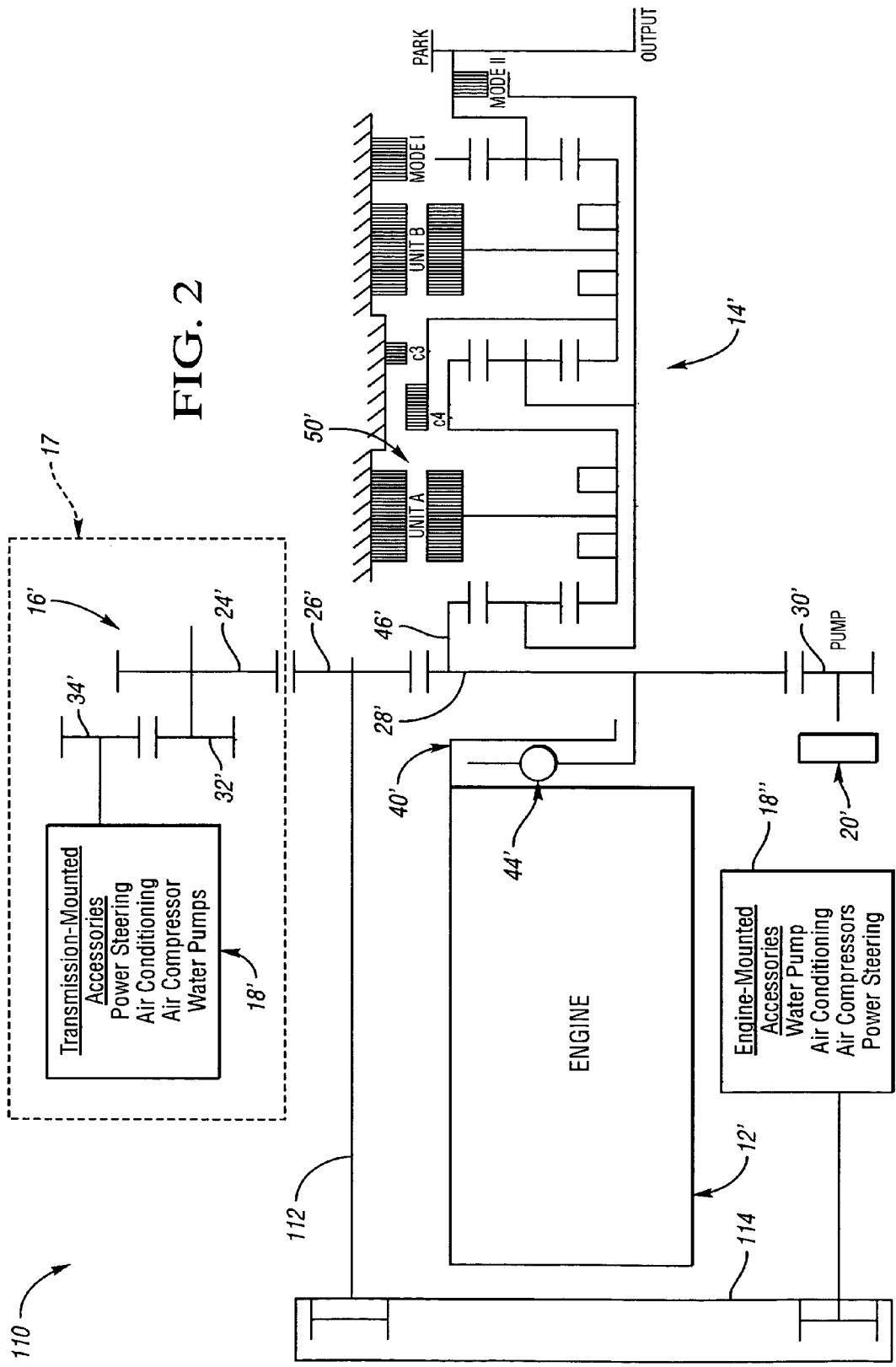
FIG. 2 shows a schematic illustration of a powertrain including an engine and hybrid electromechanical transmission arranged coaxially, as well as a plurality of accessory drive gears in accordance with an alternative embodiment of the invention.

Turning to FIG. 2, a powertrain 110 is shown in accordance with an alternative embodiment of the invention. In FIG. 2, like reference numerals are used to refer to like components from FIG. 1. As shown in FIG. 2, the engine 12' and transmission 14' are arranged coaxially end-to-end, as opposed to the parallel arrangement of FIG. 1. The transmission 14' is identical to that shown in FIG. 1, and its description will not be repeated here. Again, the transmission 14' may be replaced by any hybrid electromechanical transmission within the scope of the present invention. The input shaft 46' of the transmission 14' is connected to either accessory drive gears 16' or accessory belt/chain drive shaft 112, as determined best by the integration team.

In the embodiment illustrated within the box 17 of FIG. 2, transmission mounted accessories 18' would utilize the accessory drive which includes the gears 24', 26', 28' and 30'. The gear 28' is connected to the input shaft 46' of the transmission 14'. The accessories 18' are driven by the power take off quick change gears 32', 34'. The engine 12' is connected to the accessory drive gears 16' via the input torque transfer device 40' and torque isolator 44'.

Alternatively, as shown in FIG. 2, in the preferred embodiment, the accessory drive gear 26' may be connected to an accessory drive shaft 112 which extends parallel to a drive axis of the engine 12', and is operatively engaged with an accessory drive belt 114 of the engine 12' for driving the accessory drive belt 114. In this configuration, the location of the accessory drive belt 114 and accessories need not be rearranged (in comparison to a conventional engine/drive belt arrangement), and the motor/generator 50' of the transmission 14' may be used to drive the engine-mounted belt/chain driven accessories 18", which are located in their traditional positions on the front of the engine in this configuration, when the engine 12' is not running. Alternatively, the engine 12' may directly drive the accessory drive belt 114 and thereby drive the accessories 18". Also, with the isolator 44' positioned adjacent the engine 12', the accessories 18', 18" and the transmission 14' are isolated from engine vibrations.

While the best modes for carrying out the invention have been described in detail, those familiar with the art to which this invention relates will recognize various alternative designs and embodiments for practicing the invention within the scope of the appended claims.

The invention claimed is:

1. A vehicle powertrain comprising:
   an engine;
   a power take off arrangement including a plurality of quick-change gears;
   a plurality of continuously intermeshed accessory drive gears, wherein said accessory drive gears are respectively connectable with a plurality of accessories for driving the accessories, and are operatively connected to said power take off arrangement wherein said plurality of quick-change gears are interchangeable to alter an output speed ratio to at least one of said plurality of accessories; and a hybrid electro-mechanical transmission having an input shaft operatively connected to one of said drive gears, said transmission including a transmission housing, an output member for delivering power from said transmission, first and second motor/generators, first, second, and third planetary gear arrangements each having a plurality of gear members, at least one of said gear members in said first or second planetary gear arrangement being connected to said first motor/generator; and a plurality of torque-transmitting mechanisms for selecting operating modes and speeds of the transmission;

wherein said plurality of torque-transmitting mechanisms includes a first torque-transmitting mechanism selectively connecting one of said gear members associated with each of said first, second and third planetary gear arrangements to each other and to said output member; a second torque-transmitting mechanism selectively connecting one of said gear members of said third planetary gear arrangement with said transmission housing; and a third torque-transmitting mechanism selectively connecting one of said gear members of said second planetary gear arrangement with said transmission housing, and wherein one of said motor/generators is selectively operable to drive said accessory drive gears when said engine is not running.

2. The vehicle powertrain of claim 1, wherein said engine and transmission are arranged parallel and side-by-side.

3. The vehicle powertrain of claim 1, wherein said accessory drive gears extend transversely with respect to said engine and transmission.

4. The vehicle powertrain of claim 1, wherein said accessories are selected from the group consisting of power steering components, air conditioning components, air compressors, and water pumps.

5. The vehicle powertrain of claim 1, wherein said engine and transmission are arranged coaxially.

6. The vehicle powertrain of claim 5, further comprising an accessory drive shaft operatively connecting said accessory drive gears to an accessory drive belt of the engine, said accessory drive shaft extending parallel to a drive axis of said engine.

7. The vehicle powertrain of claim 1, wherein said hybrid electro-mechanical transmission is a two-mode compound split hybrid electro-mechanical transmission, and further comprises:

another one of said gear members in said second and third planetary gear arrangement being connected to said second motor/generator;

a first interconnecting member continuously connecting one of said gear members of said first planetary gear arrangement with one of said gear members of said second planetary gear arrangement;

a second interconnecting member continuously connecting one of said gear members of said second planetary gear arrangement with one of said members of said third planetary gear arrangement; and one of said gear members of said first planetary gear arrangement being continuously connected to said input shaft.

8. The vehicle powertrain of claim 7, wherein said plurality of torque transmitting mechanisms includes further comprises:

a fourth torque-transmitting mechanism selectively connecting one of said gear members of said second planetary gear arrangement with another one of said gear members of said second planetary gear arrangement.

9. A vehicle powertrain comprising:

an engine;

a power take off arrangement including a plurality of quick-change gears;

an input torque transfer device operatively connected to an output of said engine, said input torque transfer device including a torque isolator;

a plurality of continuously intermeshed accessory drive gears operatively connected to said torque transfer device, wherein said accessory drive gears are respectively connectable with a plurality of accessories for driving the accessories, and are operatively connected to said power take off arrangement, wherein said plurality of quick-change gears are interchangeable to alter an output speed ratio to at least one of said plurality of accessories, and wherein said torque isolator is operatively connected between said engine and said accessory drive gears so that when accessories connected to the accessory drive gears are driven by said engine the accessories are isolated from engine excitation by said torque isolator; and a hybrid electro-mechanical transmission having an input shaft operatively connected to one of said drive gears and an output member for delivering power from said transmission, said transmission including first and second motor/generators, a first, second, and third planetary gear arrangements each utilizing a plurality of gear members, and a plurality of torque-transmitting mechanisms for selecting operating modes and speeds of the transmission;

wherein at least one of said gear members in said first or second planetary gear arrangement is connected to said first motor/generator; and another one of said gear members in said second and third planetary gear arrangement is connected to said second motor/generator; said plurality of torque transmitting mechanisms including a first torque-transmitting mechanism selectively connecting one of said gear members associated with each of said first, second and third planetary gear arrangements to each other and to said output member; a second torque-transmitting mechanism selectively connecting one of said gear members of said third planetary gear arrangement with a transmission housing; and a third torque-transmitting mechanism selectively connecting one of said gear members of said second planetary gear arrangement with the transmission housing;

wherein one of said motor/generators is selectively operable to drive said accessory drive gears when said engine is not running.

10. The vehicle powertrain of claim 9, wherein said engine and transmission are arranged parallel and side-by-side.

11. The vehicle powertrain of claim 9, wherein said accessory drive gears extend transversely with respect to said engine and transmission.

12. The vehicle powertrain of claim 9, wherein said engine and transmission are arranged coaxially.

13. The vehicle powertrain of claim 12, further comprising an accessory drive shaft operatively connecting said accessory drive gears to an accessory drive belt of the engine, said accessory drive shaft extending parallel to a drive axis of said engine.

14. The vehicle powertrain of claim 9, wherein said hybrid electro-mechanical transmission is a two-mode compound split hybrid electro-mechanical transmission, and further comprises:
   a first interconnecting member continuously connecting one of said members of said first planetary gear arrangement with one of said members of said second planetary gear arrangement;
   a second interconnecting member continuously connecting one of said members of said second planetary gear arrangement with one of said members of said third planetary gear arrangement; and
   one of said gear members of said first planetary gear arrangement being continuously connected to said input member.

15. The vehicle powertrain of claim 14, wherein said two-mode compound split hybrid electro-mechanical transmission further comprises:
   a fourth torque-transmitting mechanism selectively connecting one of said gear members of said second planetary gear arrangement with another one of said gear members of said second planetary gear arrangement.

16. A vehicle powertrain comprising:
   an engine;
   a transmission;
   a power take off arrangement including a plurality of quick-change gears;
   an output member for delivering power from said transmission;
   an input torque transfer device operatively connected to an output of said engine, said input torque transfer device including a torque isolator; and
   a plurality of intermeshed accessory drive gears operatively connected to said input torque transfer device, wherein said accessory drive gears are respectively connectable with a plurality of accessories for driving the accessories, and are operatively connected to said power take off arrangement, wherein said plurality of quick-change gears are interchangeable to alter an output speed ratio to at least one of said plurality of accessories;
   wherein said transmission is a two-mode compound split hybrid electro-mechanical transmission having an input shaft operatively connected to one of said drive gears, said transmission including a transmission housing, first and second motor/generators, first, second, and third planetary gear arrangements each utilizing first, second, and third planetary gear members; a plurality of torque-transmitting mechanisms for selecting operating modes and speeds of the transmission, including a first torque-transmitting mechanism selectively connecting one of said gear members associated with each of said first, second and third planetary gear arrangements to each other and to said output member, a second torque-transmitting mechanism selectively connecting one of said gear members of said third planetary gear arrangement with said transmission housing, and a third torque-transmitting mechanism selectively connecting one of said gear members of said second planetary gear arrangement with said transmission housing;
   a first interconnecting member continuously connecting one of said members of said first planetary gear arrangement with one of said members of said second planetary gear arrangement; and
   a second interconnecting member continuously connecting one of said members of said second planetary gear arrangement with one of said members of said third planetary gear arrangement;
   wherein one of said gear members of said first planetary gear arrangement is continuously connected to said input shaft, wherein at least one of said gear members in said first or second planetary gear arrangement is connected to said first motor/generator, and another of said gear members in said second and third planetary gear arrangements is connected to said second motor/generator, and wherein one of said motor/generators is selectively operable to drive said accessory drive gears when said engine is not running.

17. The vehicle powertrain of claim 16, wherein said transmission further comprises:
   a fourth torque-transmitting mechanism selectively connecting one of said gear members of said second planetary gear arrangement with another one of said gear members of said second planetary gear arrangement.

* * * * *